(12) United States Patent
Bennett

(10) Patent No.: US 8,378,208 B1
(45) Date of Patent: Feb. 19, 2013

(54) AMTEC POWER SYSTEM WITH THERMAL BLOCK

(75) Inventor: Mark D. Bennett, Benld, IL (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 12/580,582

(22) Filed: Oct. 16, 2009

Related U.S. Application Data

(63) Continuation-in-part of application No. 12/564,586, filed on Sep. 22, 2009, and a continuation-in-part of application No. 12/537,346, filed on Aug. 7, 2009.

(51) Int. Cl.
*H01L 35/00* (2006.01)

(52) U.S. Cl. .................... 136/236.1; 136/206

(58) Field of Classification Search ............... 136/236.1
See application file for complete search history.

(56) References Cited

U.S. PATENT DOCUMENTS

| | | | |
|---|---|---|---|
| 4,055,948 A | 11/1977 | Kraus et al. | |
| 4,148,300 A | 4/1979 | Kaufman, Sr. | |
| 4,188,941 A | 2/1980 | Hopkins | |
| 4,292,579 A | 9/1981 | Constant | |
| 4,459,970 A | 7/1984 | Clee | |
| 4,510,210 A | 4/1985 | Hunt | |
| 4,545,366 A | 10/1985 | O'Neill | |
| 4,835,071 A | 5/1989 | Williams et al. | |
| 4,857,421 A | 8/1989 | Ernst | |
| 5,085,948 A * | 2/1992 | Tsukamoto et al. | 429/11 |
| 5,143,051 A | 9/1992 | Bennett | |
| 5,317,145 A | 5/1994 | Corio | |
| 5,441,575 A | 8/1995 | Underwood et al. | |
| 5,518,554 A | 5/1996 | Newman | |
| 5,942,719 A | 8/1999 | Sievers et al. | |
| 6,313,391 B1 | 11/2001 | Abbott | |
| 6,656,238 B1 | 12/2003 | Rogers et al. | |
| 7,431,570 B2 | 10/2008 | Young et al. | |
| 2001/0008121 A1 | 7/2001 | Tanabe et al. | |
| 2003/0037814 A1 | 2/2003 | Cohen et al. | |
| 2004/0101750 A1 | 5/2004 | Burch | |
| 2005/0223632 A1 * | 10/2005 | Matviya et al. | 44/620 |
| 2006/0086118 A1 | 4/2006 | Venkatasubramanian et al. | |
| 2006/0231133 A1 | 10/2006 | Fork et al. | |
| 2006/0243317 A1 * | 11/2006 | Venkatasubramanian | 136/206 |
| 2008/0000516 A1 | 1/2008 | Shifman | |

FOREIGN PATENT DOCUMENTS

| | | |
|---|---|---|
| DE | 4028403 | 3/1992 |
| DE | 4028404 | 3/1992 |
| DE | 4028406 | 3/1992 |
| DE | 10033157 | 1/2002 |

OTHER PUBLICATIONS

Bossman, DE4028406, Mar. 12, 1992, machine translation, 1-8.*
Schock, A. et al., "Design, Analyses, and Fabrication Procedure of AMTEC Cell, Test Assembly, and Radioisotope Power System for Outer-Planet Missions," *Acta Astronautica*, vol. 50, No. 8, pp. 471-510 (2002).
Sievers, R.K. et al., "Alkali Metal Thermal to Electric Conversion," *Mechanical Engineering* (11 pages) (1995).
PCT, International Search Report and Written Opinion, International Application No. PCT/US2010/044140 (Dec. 7, 2010).

(Continued)

*Primary Examiner* — Miriam Berdichevsky
(74) *Attorney, Agent, or Firm* — John A. Lepore

(57) ABSTRACT

An AMTEC power system including a housing that defines a cold chamber and a hot chamber, at least one AMTEC cell received in the housing, the AMTEC cell having a first portion extending into the hot chamber and a second portion extending into the cold chamber, and a thermally conductive material positioned adjacent to the first portion.

17 Claims, 3 Drawing Sheets

OTHER PUBLICATIONS

PCT, International Search Report and Written Opinion, International Application No. PCT/US2010/044069 (Mar. 7, 2011).

Buschle, J. et al. (2006) Latent Heat Storage Process Heat Applications, ECOSTOCK 2006, Stockton New Jersey, 31.5-2.6.2006.

US, Notice of Allowance, U.S. Appl. No. 12/537,346 (Jul. 13, 2012).

US, Office Action, U.S. Appl. No. 12/537,346 (Jan. 11, 2012).

US, Office Action, U.S. Appl. No. 12/564,586 (May 1, 2012).

Insaco, Alumina Properties, Mar. 2, 2006, http://www.azom.com/article.aspx?ArticleID=3269.

Touchstone Labs, Carbon foam insulation applications, Jul. 4, 2007, www.cfoam.com/insulation.htm (via wayback machine).

Powell, R.W. et al., "Thermal Conductivity of Selected Materials," National Standard Reference Data System, U.S. Department of Commerce, pp. 1-20 (1966).

Zalba, B. et al., "Review on thermal energy storage with phase change: materials, heat transfer analysis and applications," Applied Thermal Engineering, vol. 23, pp. 251-283 (2003).

US, Office Action, U.S. Appl. No. 12/564,586 (Oct. 12, 2012).

* cited by examiner

AMTEC POWER SYSTEM WITH THERMAL BLOCK

PRIORITY

This application is a continuation-in-part of U.S. Ser. No. 12/564,586 filed on Sep. 22, 2009, which is a continuation-in-part of U.S. Ser. No. 12/537,346 filed on Aug. 7, 2009. The entire contents of both the '586 and the '346 applications are incorporated herein by reference.

FIELD

This application relates to alkali metal thermal-to-electric converter ("AMTEC") power systems and, more particularly, to solar AMTEC power systems.

BACKGROUND

Concentrating solar power systems employ optical elements, such as mirrors and lenses, to focus a large area of incoming sunlight into a concentrated location. For example, parabolic trough concentrating solar power systems employ elongated parabolic mirrors that focus incoming sunlight on elongated receivers supported over the mirrors. The entire parabolic trough assembly may be supported on a tracker that maintains precise alignment of the mirrors with the sun as the sun moves across the sky.

AMTEC power systems are configured to take advantage of temperature gradients across an AMTEC cell to convert thermal energy directly into electrical energy. A typical AMTEC cell includes a beta-alumina solid electrolyte ("BASE"), which is an electronic insulator and an ionic conductor. In an AMTEC power system. the AMTEC cell defines a barrier between a hot side and a cold side and the opposing sides of the cell are electrically coupled through an external load circuit. When an alkali metal, such as sodium, is heated on the hot side of the cell, the sodium metal gives up electrons which pass through the load circuit while corresponding sodium ions pass through the electrolyte to the cold side of the system, thereby driving an electric current. At the cold side, sodium ions are neutralized by the electrons returning from the load circuit to yield condensed sodium metal, which may then be recycled to the hot side of the system.

Solar AMTEC power systems utilize concentrating solar power optical systems to generate the required temperature gradient across the AMTEC cell that drives the electric current. However, existing solar AMTEC power systems employ complex mechanisms, such as pumps and wicks, for regenerating the condensed alkali metal. Such regeneration mechanisms increase the overall cost of such systems and, if they contain moving parts, substantially increase the likelihood of failure.

Accordingly, those skilled in the art continue to seek advances in the field of solar AMTEC power systems.

SUMMARY

In one aspect, the disclosed AMTEC power system may include a housing that defines a cold chamber and a hot chamber, at least one AMTEC cell received in the housing, the AMTEC cell having a first portion extending into the hot chamber and a second portion extending into the cold chamber, and a thermally conductive material positioned adjacent to the first portion.

In another aspect, the disclosed AMTEC power system may include housing that defines a cold chamber and a hot chamber, at least one AMTEC cell received in the housing, the AMTEC cell having a first portion extending into the hot chamber and a second portion extending into the cold chamber, and a thermally conductive material positioned adjacent to the first portion, the thermally conductive material comprising graphite and having a thermal conductivity of at least about 200 W/(m·° K.).

In yet another aspect, the disclosed AMTEC power system may include a housing that defines a cold chamber and a hot chamber, at least one AMTEC cell received in the housing, the AMTEC cell having a first portion extending into the hot chamber and a second portion extending into the cold chamber, and a thermal block disposed between the hot chamber and the cold chamber, wherein the thermal block includes a thermally insulative material and a thermally conductive material, and wherein the thermally insulative material is disposed between the thermally conductive material and the cold chamber.

Other aspects of the disclosed AMTEC power system will become apparent from the following description, the accompanying drawings and the appended claims.

DETAILED DESCRIPTION

Figure 1:
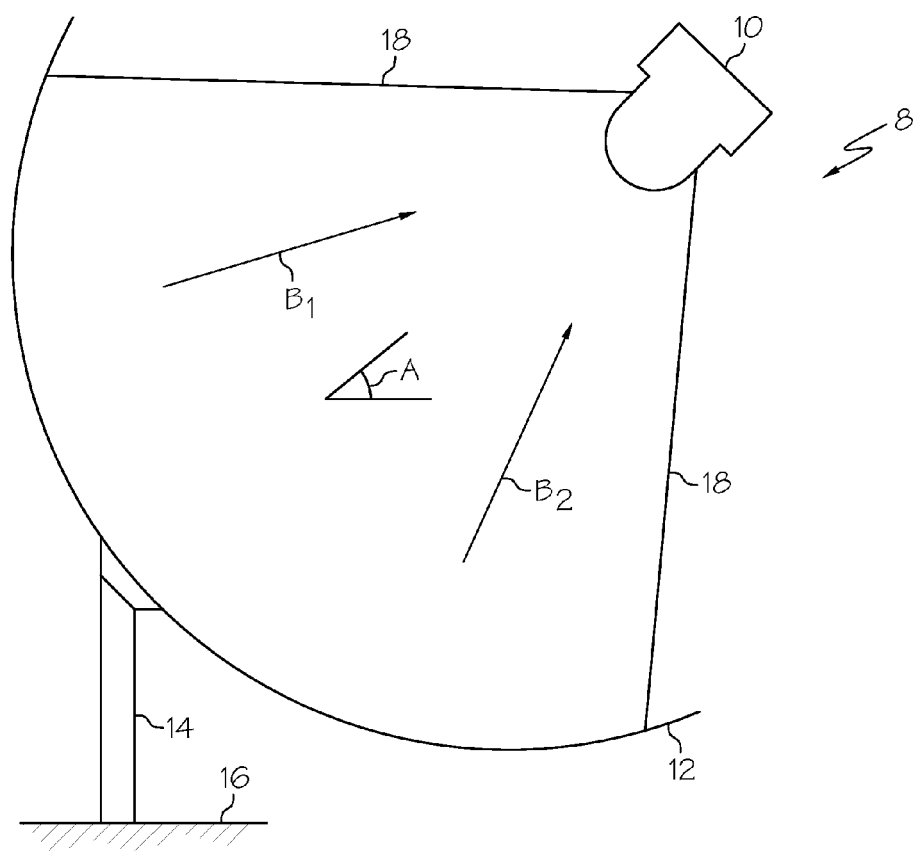
FIG. 1 is a schematic side elevational view of a concentrating solar power system having a thermal absorber configured in accordance with an aspect of the present disclosure.

As shown in FIG. 1, one aspect of a solar AMTEC power system, generally designated 8, may include a thermal absorber 10, an optical element 12, a first support structure 14 for supporting the optical element 12 relative to a sub-structure 16, and a second support structure 18 for supporting the thermal absorber 10 relative to the optical element 12. The optical element 12 and associated thermal absorber 10 may be disposed at an angle A relative to the sub-structure 16, and may direct incoming solar energy to the thermal absorber 10, as shown by arrows $B_1$, $B_2$. Optionally, the first support structure 14 may be a tracker (not shown) configured to maintain alignment between the optical element 12 and the solar energy source (not shown).

As shown in FIG. 1, the optical element 12 may be a parabolic mirror of a parabolic trough. However, those skilled in the art will appreciate that various concentrating solar power systems may be configured to use the disclosed thermal absorber 10 without departing from the scope of the present disclosure, including, for example, multiple or segmented mirrors, Fresnel mirrors, and lenses.

Figure 2:
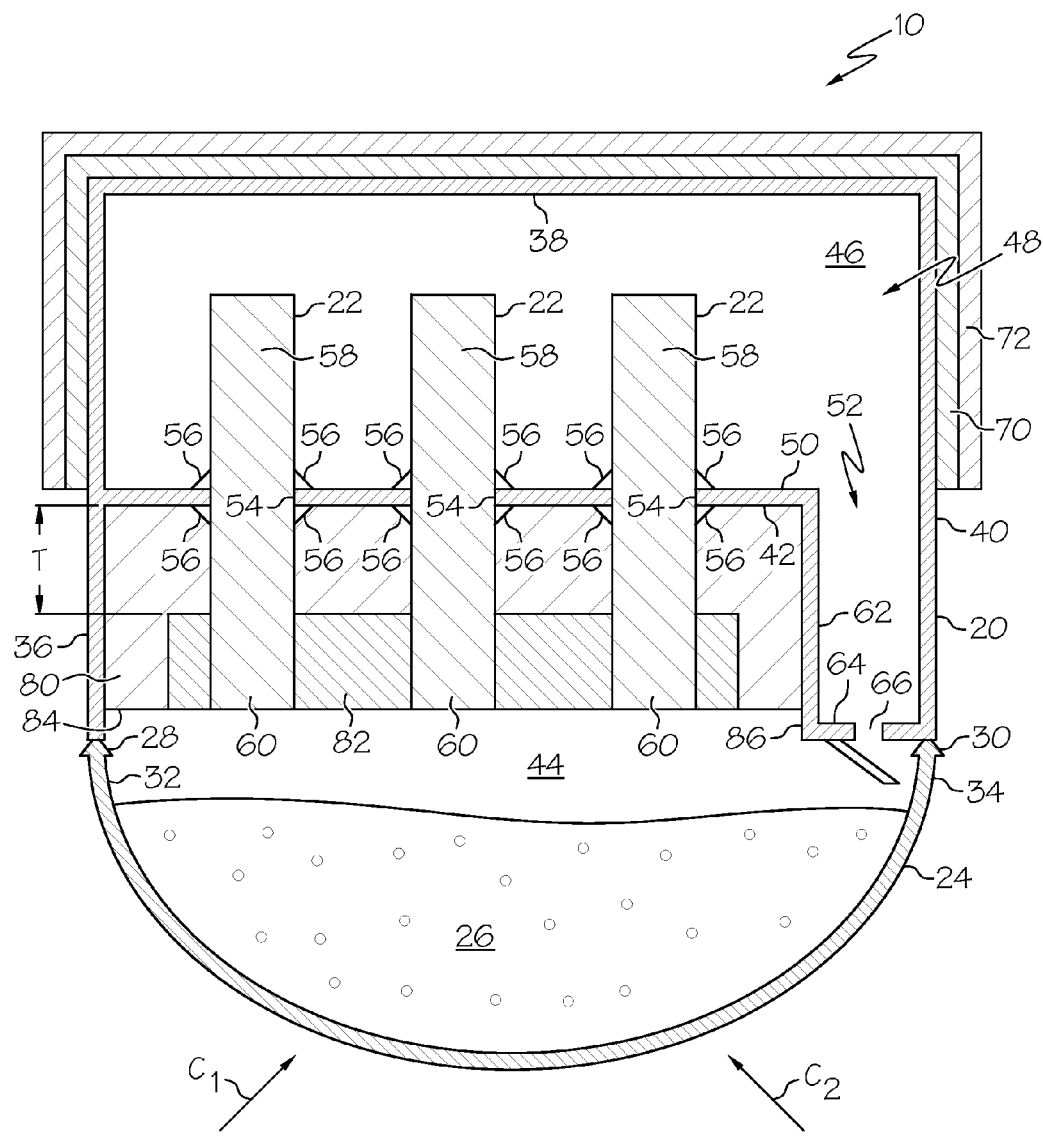
FIG. 2 is a schematic cross-sectional view of the thermal absorber shown in FIG. 1.

Referring to FIG. 2, the disclosed thermal absorber 10 may include a housing 20, one or more AMTEC cells 22 and a reservoir 24 containing an alkali metal 26. The AMTEC cells 22 may be any AMTEC cells known in the art, and may include an anode (not shown), a cathode (not shown) and an electrolyte (not shown), such as a beta-alumina solid electrolyte. For example, the AMTEC cells may be hollow-rod-type AMTEC cells.

The reservoir 24 may be sealingly coupled to the housing 20 to define an enclosed volume 48 within the thermal absorber 10. For example, the housing 20 may include U-shaped brackets 28, 30 into which the ends 32, 34 of the reservoir 24 may be received. Gaskets (not shown) or a sealant (not shown) may be used to ensure a vapor tight seal between the housing 20 and the reservoir 24.

Figure 3:
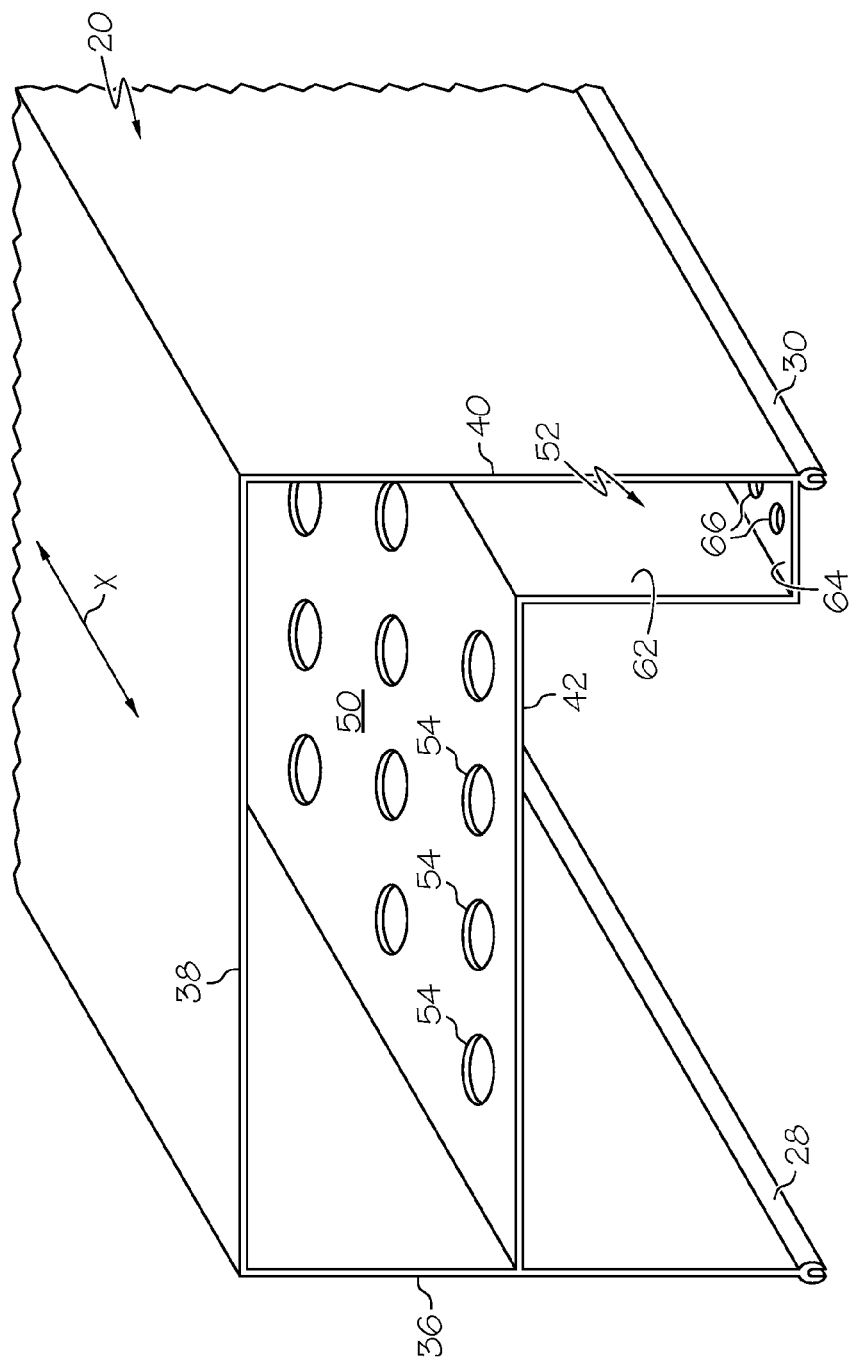
FIG. 3 is a side perspective view of the housing of the thermal absorber of FIG. 2.

As shown in FIG. 3, the housing 20 may be elongated along an axis X, as is known in the art. Correspondingly, the reservoir 24 may be elongated along the axis X to define a trough that supports the alkali metal 26. Therefore, in one aspect, the thermal absorber 10 may be configured as an elongated tube-like absorber. However, those skilled in the art will appreciate that the thermal absorber 10 may be configured in various geometries to accommodate various concentrating solar power systems. For example, the thermal absorber 10 may be configured as a discrete, single point receiver with a dome-shaped reservoir 24 for use with a parabolic dish mirror.

The reservoir 24 may be formed from any material that is at least partially transparent to solar energy such that incoming solar energy (arrows $C_1$, $C_2$) penetrates the reservoir 24 and heats the alkali metal 26 supported in the reservoir 24. In one particular aspect, the reservoir 24 may be formed from a material having high light transmittance and low light reflectance. For example, the reservoir 24 may be constructed from glass, such as low-iron glass, or optically clear (or at least partially clear) ceramic. The wall thickness of the reservoir 24 may be selected to optimize solar energy collection/retention as well as mechanical strength, which may depend on the environment in which the thermal absorber 10 will be deployed.

The shape of the reservoir 24 may be dictated by the type of concentrating solar power system being used and may be configured to maximize the collection and retention of incoming solar energy. For example, as shown in FIG. 2, the reservoir 24 may be dome-shaped in cross-section.

The alkali metal 26 may substantially fill the reservoir 24, as is known in the art. While sodium metal is currently most commonly used, those skilled in the art will appreciate that other alkali metals, such as lithium, potassium and rubidium, may also be used. Furthermore, those skilled in the art will appreciate that the alkali metal 26 may be substituted with other materials capable of providing the same function in the thermal absorber 10 without departing from the scope of the present disclosure.

Referring now to FIGS. 2 and 3, the housing 20 may include a first side wall 36, a top wall 38 and a second side wall 40. Additionally, the housing 20 may include a thermal barrier wall 42 which may divide the enclosed volume 48 of the thermal absorber 10 into a hot chamber 44 and a cold chamber 46. The hot chamber 44 may be bounded by the first side wall 36, the reservoir 24 and the thermal barrier wall 42. Therefore, the hot chamber 44 may be in direct fluid communication with the alkali metal 26 such that the hot chamber 44 may receive alkali metal vapor when the alkali metal 26 in the reservoir is heated. The cold chamber 46 may be bounded by the first and second side walls 36, 40, the top wall 38 and the thermal barrier wall 42.

The housing 20 may be formed from a generally rigid material, such as aluminum, steel (e.g., stainless steel) or the like. Appropriate non-metal materials may also be used, such as plastic. For example, the housing 20 may be constructed from internally or structurally reinforced plastic. Those skilled in the art will appreciate that the housing 20 may be constructed using well known forming techniques, such as cutting and welding.

The thermal barrier wall 42 may extend from the first side wall 36 to the second side wall 40 and may define a cell supporting surface 50 and a sump 52. In one aspect, the sump 52 may be partially defined by the thermal barrier wall 42 and partially by the second side wall 40, as shown in FIGS. 2 and 3. In another aspect (not shown), the sump 52 may be entirely defined by the thermal barrier wall 42.

The cell supporting surface 50 of the thermal barrier wall 42 may include one or more holes 54 formed therein. The holes 54 may be sized and shaped to receive and support the AMTEC cells 22 therein, as shown in FIG. 2. The AMTEC cells 22 may extend through the holes 54 in the thermal barrier wall 42 such that a first portion 58 of each AMTEC cell 22 extends into the cold chamber 46 and a second portion 60 of each AMTEC cell 22 extends into the hot chamber 44. A thermal adhesive 56, such as a thermal adhesive available from Dow Corning Corporation of Midland, Mich., may be used to secure the AMTEC cells 22 in the holes 54 and to the thermal barrier wall 42.

Optionally, as shown in FIG. 2, a thermally insulative material 80 may be disposed between the hot and cold chambers 44, 46 to increase the temperature gradient across the hot and cold chambers 44, 46, thereby improving the efficiency of the thermoelectric effect. The insulative material 80 may be coupled to all or a portion of the thermal barrier wall 42, and may be disposed on either the hot side 44 (shown) or the cold side (not shown) of the thermal barrier wall 42.

Those skilled in the art will appreciate that the insulative material 80 may have a thickness T and a thermal conductivity such that the desired temperature gradient across the hot and cold chambers 44, 46 is achieved. The thickness T of the insulative material 80 may depend on the overall size of the thermal absorber 10 and the thermal conductivity of the insulative material 80, among other things.

In one particular aspect, the insulative material 80 may be a carbon foam, such as a coal-based carbon foam as described in U.S. Pat. No. 6,656,238, the entire contents of which are incorporated herein by reference. For example, the insulative material 80 may be CFOAM® carbon foam available from Touchstone Research Laboratories, Ltd. of Triadelphia, W. Va. As a specific example, the insulative material 80 may be CFOAM-20 carbon foam, which has a thermal conductivity (ASTM E 1225) as low as about 0.25 W/(m·° K.), but which can be tailored to have a thermal conductivity of up to 25 W/(m·° K.), and a nominal density (ASTM D1622) of about 0.32 g/cm$^3$.

At this point, those skilled in the art will appreciate that carbon foam is capable of withstanding high temperatures (e.g., temperatures in excess of 600 ° C.) within the thermal absorber 10, while still providing significant insulation capabilities (e.g., thermal conductivities below about 30 W/(m·° K.)) without introducing a substantial amount of weight.

Still referring to FIG. 2, a thermally conductive material 82 may be positioned adjacent to at least a portion of the second portion 60 (i.e., the hot side) of the AMTEC cells 22. The term "adjacent" is intended to include an assembly in which the conductive material 82 is positioned in direct contact with the AMTEC cells 22, as well as an assembly in which the conductive material 82 is positioned in close proximity to the AMTEC cells 22.

At this point, those skilled in the art will appreciate that the thermally conductive material 82 may direct thermal energy to the hot side of the AMTEC cells 22. Those skilled in the art will also appreciate that the thermally conductive material 82 may provide the thermal absorber 10 with thermal energy storage capabilities such that thermal energy may continue to be directed to the hot side of the AMTEC cells 22 even when incoming energy has been reduced or ceased.

The conductive material 82 may be any thermally conductive material capable of withstanding the high temperatures (e.g., temperatures in excess of 600 ° C.) within the hot chamber 44 of the thermal absorber 10. In one aspect, the conductive material may have a thermal conductivity of at least about 100 W/(m·° K.), such as at least about 150 W/(m·° K.) or at least about 200 W/(m·° K.). In one particular aspect, the conductive material 82 may be a graphitic foam-type material, such POCO HTC, which is available from Poco Graphite, Inc. of Decatur, Tex., and which has a thermal conductivity of about 245 W/(m·° K.).

In one exemplary aspect, the insulative material 80 and the conductive material 82 may be part of a thermal block 84 disposed between the hot and cold chambers 44, 46. The thermal block 84 may be constructed such that the conductive material 82 is positioned adjacent to at least one AMTEC cell 22, but is thermally isolated from the housing 20 and the thermal barrier wall 42, and ultimately from the cold chamber 46, by the insulative material 80. For example, the thermal block 84 may be supported in a chamber 86 defined by the housing 20 and the thermal barrier wall 42.

The sump 52 may be positioned adjacent to the cell supporting surface 50 to act as a gravity drain that receives fluid that has condensed in the cold chamber 46 of the thermal absorber 10. In one aspect, as shown in FIG. 2, the cell supporting surface 50 may extend generally perpendicular to the first wall 36. Therefore, referring to FIG. 1, when the thermal absorber 10 is mounted at an angle to the sub-structure 16, gravity will direct condensed fluid from the cell supporting surface 50 to the sump 52. In another aspect, the cell supporting surface 50 itself may be angled towards the sump 52 such gravity directs condensed fluid to the sump 52. For example, the cell supporting surface 50 may be disposed at a non-right angle relative to the side wall 62 of the sump 52.

Referring to FIGS. 2 and 3, the base surface 64 of the sump 52 may include one or more drain holes 66 that provide fluid communication between the cold chamber 46 and the hot chamber 44, thereby allowing fluid collected in the sump 52 to return to the reservoir 26. Fluid flow between the sump 52 and the reservoir 26 may be driven by gravity. An optional directional barrier 68 or flap may direct fluid egress from the sump 52 to the reservoir 24 and may obstruct vapor ingress from the hot chamber 44 to the sump 52.

Accordingly, incoming solar energy (arrows $C_1$, $C_2$) may heat the alkali metal 26 in the reservoir 24 to form a vapor in the hot chamber 44. The hot vapor may interact with the AMTEC cells to generate electricity, as is well known in the art, resulting in condensed alkali metal in the cold chamber 46. The condensed alkali metal may flow, by gravity, to the sump 52, wherein the condensed alkali metal drains, by way of drain hole 66, back to the reservoir 24. Therefore, the disclosed thermal absorber 10 provides for gravity-driven counterflow regeneration of the alkali metal.

Condensation within the cold chamber 46 may be facilitated by radiating heat from the walls of the housing 20 surrounding the cold chamber 46. For example, as shown in FIG. 2, a first layer 70 of a highly thermally conductive material may be coupled to the housing 20 surrounding the cold chamber 46. Optionally, a second layer 72 of a highly thermally conductive material may be coupled to the first layer 70 of highly thermally conductive material. An exemplary first highly thermally conductive material is PTM 3180, which is available from Honeywell of Morris Township, N.J. An exemplary second highly thermally conductive material is POCO HTC, which is available from Poco Graphite, Inc. of Decatur, Tex.

Although various aspects of the disclosed AMTEC power system with thermal block have been shown and described, modifications may occur to those skilled in the art upon reading the specification. The present application includes such modifications and is limited only by the scope of the claims.

What is claimed is:

1. A power system comprising:
    a housing defining a cold chamber and a hot chamber, said hot chamber having a wall transparent to solar radiation;
    at least one alkali metal thermal-to-electric converter ("AMTEC") cell received in said housing, said AMTEC cell having a first portion extending into said hot chamber and a second portion extending into said cold chamber
    a thermal barrier wall separating said cold chamber and said hot chamber, said AMTEC cell extending through said thermal barrier wall, said thermal barrier wall having a layer of thermally insulative material; and
    a layer of thermally conductive material adjacent said thermal barrier wall and positioned adjacent said first portion such that said first portion protrudes therethrough, said layer of thermally conductive material being positioned in said hot chamber such that solar radiation passing through said transparent wall heats said layer of thermal conductive material and said layer of thermally conductive material promotes operation of said AMTEC cell.

2. The power system of claim 1 wherein said thermally conductive material has a thermal conductivity of at least about 100 W/(m·° K.).

3. The power system of claim 1 wherein said thermally conductive material has a thermal conductivity of at least about 150 W/(m·° K.).

4. The power system of claim 1 wherein said thermally conductive material has a thermal conductivity of at least about 200 W/(m·° K.).

5. The power system of claim 1 wherein said thermally conductive material has a thermal conductivity of about 245 W/(m·° K.).

6. The power system of claim 1 wherein said thermally conductive material includes graphite.

7. The power system of claim 1 wherein said thermally conductive material includes a graphitic foam-type material.

8. The power system of claim 1 wherein said thermally insulative material is disposed between said cold chamber and said thermally conductive material.

9. The power system of claim 1 wherein said thermally conductive material connected to said housing is formed as a layered structure comprising a first layer of conductive material and a second layer of conductive material, said first layer being different than said second layer.

10. A power system comprising:
    a housing that defining cold chamber and a hot chamber, said hot chamber having a wall transparent to solar radiation;
    at least one alkali metal thermal-to-electric converter ("AMTEC") cell received in said housing, said AMTEC cell having a first portion extending into said hot chamber and a second portion extending into said cold chamber
    a thermal barrier wall separating said cold chamber and said hot chamber, said AMTEC cell extending through said thermal barrier wall, said thermal barrier wall having a layer of thermally insulative material; and
    a layer of thermally conductive material adjacent said thermal barrier wall and positioned adjacent said first portion such that said first portion protrudes therethrough, said layer of thermally conductive material being positioned in said hot chamber such that solar radiation passing through said transparent wall heats said layer of thermally conductive material and said layer of thermally conductive material promotes operation of said AMTEC cell;

said thermally conductive material being composed of a material including graphite and having a thermal conductivity of at least about 200 W/(m·° K.).

11. A power system comprising:

a housing defining a cold chamber and a hot chamber, said hot chamber having a wall transparent to solar radiation;

at least one alkali metal thermal-to-electric converter ("AMTEC") cell received in said housing, said AMTEC cell having a first portion extending into said hot chamber and a second portion extending into said cold chamber a thermal barrier wall separating said cold chamber and said hot chamber, said AMTEC cell extending through said thermal barrier wall, said thermal barrier wall having a layer of thermally insulative material;

a layer of thermally conductive material adjacent said thermal barrier wall and positioned adjacent said first portion such that said first portion protrudes therethrough, said layer of thermally conductive material being positioned in said hot chamber such that solar radiation passing through said transparent wall heats said layer of thermally conductive material and said layer of thermally conductive material promotes operation of said AMTEC cell; and a thermal block disposed between said hot chamber and said cold chamber, wherein said thermal block includes said layer of thermally insulative material and said layer of thermally conductive material, and wherein said thermally insulative material is disposed between said thermally conductive material and said cold chamber.

12. The power system of claim 11 wherein said thermally conductive material has a thermal conductivity of at least about 200 W/(m·° K.).

13. The power system of claim 11 wherein said thermally conductive material has a thermal conductivity of about 245 W/(m·° K.).

14. The power system of claim 11 wherein said thermally conductive material includes graphite.

15. The power system of claim 11 wherein said thermally conductive material includes a graphitic foam-type material.

16. The power system of claim 11 wherein said AMTEC cell extends through said thermal block and is in physical contact with said thermally conductive material.

17. The power system of claim 11 wherein said housing defines a chamber and said thermal block is received in said chamber.

* * * * *